United States Patent [19]
Mole

[11] 3,897,187

[45] July 29, 1975

[54] APPARATUS FOR THE CONTINUOUS PRODUCTION OF LAMINATED ELECTRIC CONDUCTORS

[75] Inventor: Leon Mole, Lancaster, England

[73] Assignee: Greengate Cables Limited, Manchester, England

[22] Filed: Aug. 13, 1973

[21] Appl. No.: 387,628

Related U.S. Application Data

[63] Continuation-in-part of Ser. No. 198,979, Nov. 15, 1971, abandoned.

[52] U.S. Cl. .................. 425/90; 264/130; 425/114; 425/505
[51] Int. Cl. .............................................. B29f 3/10
[58] Field of Search ............ 117/226; 264/130, 131, 264/134, 135, 136, 137, 174; 425/113, 90, 91, 92, 114, 455, 501, 505, 506, 515, 516; 156/47, 48, 55, 51

[56] References Cited
UNITED STATES PATENTS

| | | |
|---|---|---|
| 2,200,776 | 5/1940 | Hoover .......................... 156/55 X |
| 2,655,690 | 10/1953 | Henning .......................... 264/174 X |
| 2,682,292 | 6/1954 | Nagin ............................ 425/505 X |
| 3,211,818 | 10/1965 | Beckwith ........................ 264/174 X |
| 3,247,020 | 4/1966 | Shulver et al. .................... 117/226 |
| 3,504,395 | 4/1970 | MacPherson .................... 425/114 X |
| 3,728,424 | 4/1973 | Bauer ............................. 264/174 X |
| 3,737,490 | 6/1973 | Nicholson ........................ 425/113 X |

*Primary Examiner*—Francis S. Husar
*Assistant Examiner*—Mark Rosenbaum
*Attorney, Agent, or Firm*—Norris & Bateman

[57] ABSTRACT

Apparatus for the continuous production of laminated conductors comprises drawing a plurality of conductors in strip form one above the other from pads or drums by a pair of catapillar tractors, passing the assembled strips through an extruder and to apply a coating of a plastics or elastomeric material to surround the conductors, drawing the coated conductors through a cooler or through a vulcanising unit by a second pair of catapillar tractors and finally winding the coated conductors onto a take up drum.

4 Claims, 4 Drawing Figures

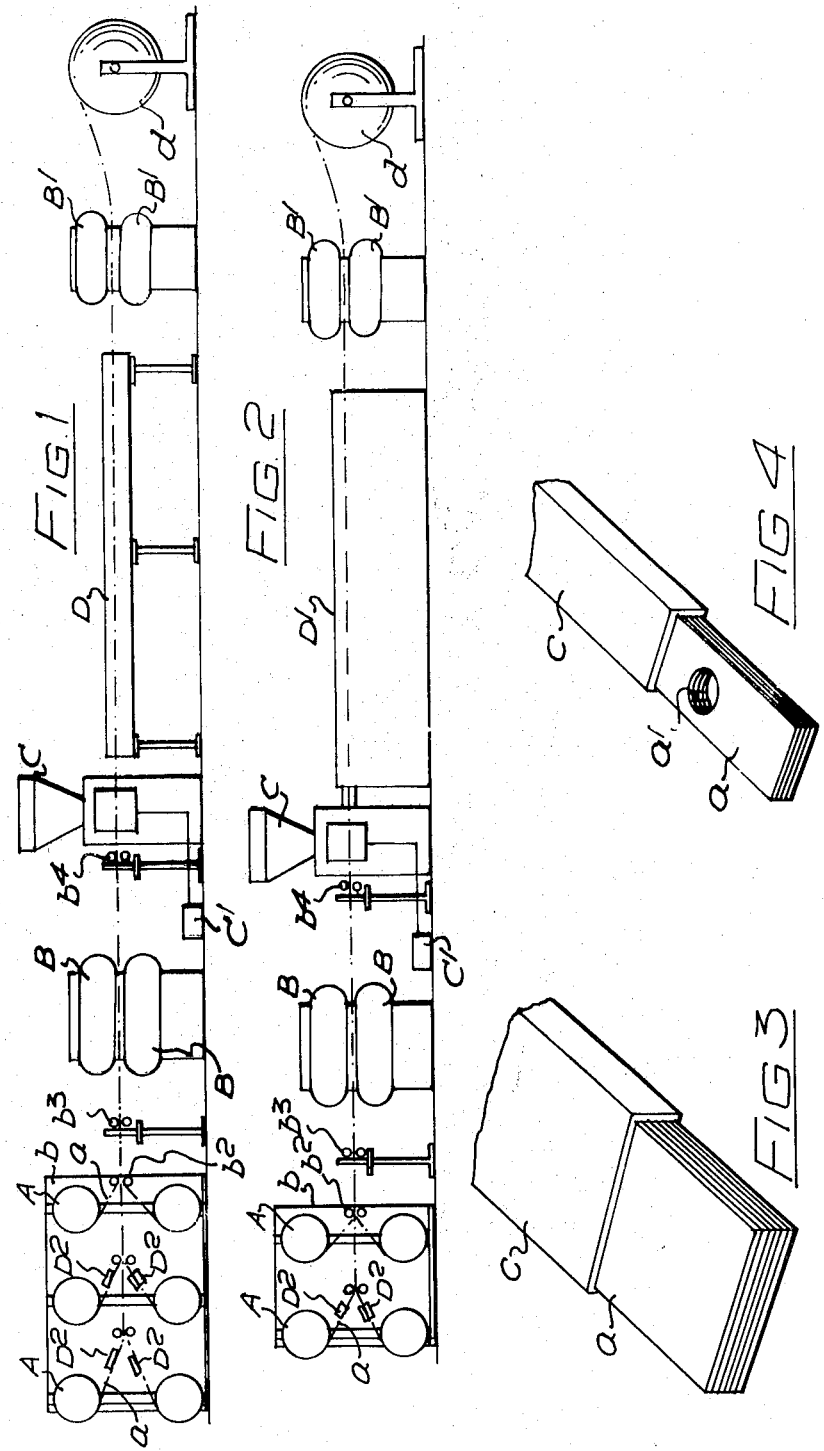

APPARATUS FOR THE CONTINUOUS PRODUCTION OF LAMINATED ELECTRIC CONDUCTORS

This is a continuation-in-part of Ser. No. 198,979 filed Nov. 15, 1971, now abandoned.

This invention relates to an improved apparatus for the continuous production of laminated electric conductors.

It has been proposed to produce laminated electrical conductors, each lamination comprising a flat strip of conducting material, for uses associated with switches and switchgear cubicles, by enclosing a plurality of the laminar strips built up one above another to give any required cross sectional area according to the load to be carried, in a sleeve or sheath of a plastics insulating material subsequently shrunk to hold the laminations firmly in contact. Such conductors however can only be made in relatively short lengths which is a slow process and also gives rise to excessive waste of material.

It has been found that there is less physically produced adhesion between a polished surface and a matt surface than between two polished surfaces.

When two highly polished surfaces are brought into contact with one another, the atmospheric air pressure forces them together and almost all the air between them is forced out. To separate the surfaces or allow one surface to slide one over the other it is necessary to apply a force sufficient to overcome the bond due to atmospheric air pressure. On the other hand, it has now been found that if one of the surfaces is not highly polished but has a dull or matt finish, resulting from surface roughness, and it is believed that the peaks and valleys comprising this roughness allow a sufficient amount of air to remain between the surfaces to more or less equalise the atmospheric air pressure acting on the outside faces of the surfaces so that the surfaces can be easily separated or caused to slide one over the other.

The object of the invention is the condinuous production of a laminated conductor enclosed by an envelope of a matt surfaced plastics insulating material to enable the conductors to be capable of sliding within the coating.

The invention comprises apparatus for the continuous production of laminated electrical conductors comprising drawing a plurality of conductors in strip form one above the other from drums by a haul-off unit, passing the assembled strips through an extruder to apply a coating of a matt plastics or elastomeric material to surround the conductors, to allow relative movement between the strips and the coating, drawing the coated conductors through the extruder and through a cooler or vulcanising unit by a second haul-off unit and finally winding the coated conductors onto a take up drum.

A machine for carrying out the method comprises a frame supporting a plurality of drums of strip conductors, a haul-off unit to draw the strips one above the other from the drums, an extruder to apply a coating of a plastics material to surround the assembled conductors, a second haul-off unit draw the conductors through the extruder and through a cooling zone and a take up drum onto which the coated conductor is wound.

The invention will be described with reference to the accompanying drawings:

FIG. 1 is a diagrammatic elevation of a machine for the production of laminated conductors;

FIG. 2 is a diagrammatic elevation of a modified machine;

FIGS. 3 and 4 are perspective views of portions of conductors produced on the machine.

Supply packages in the form of drums A of flat polished strip conductors $a$ are mounted on a machine frame $b$ or $b^1$, there being as many drums as the number of laminations required in the final conductor, four being shown on the frame $b$ and six on the frame $b^1$, the frame $b$ or $b^1$ being employed as required.

The strips $a$ are drawn from the drums A by a belt haul-off unit B through pairs of rollers $b^2$ to straighten out the strips and finally through a pair of collection rollers $b^3$ to align the strips and provide a strip assembly wherein the strips are disposed one above the other in coextensive surface electrically conductive contact as shown in FIGS. 3 and 4.

The strips $a$ FIGS. 3 and 4 may be lubricated before winding on the drum or by a conductive lubricant such as graphite paste applied by a doctor or other spreading device or by spraying to allow the strips $a$ to slide over each other when the conductor is flexed, the lubricant applying device being diagrammatically indicated in the drawing at $D^2$.

The lubricant is shown as applied to the upper face of each strip $a$ except for the outer pair of strips and if desired lubricant may be applied to the lower face of the penultimate strips. The pads are of felt or similar material and are periodically charged with lubricant, e.g., a graphite paste. The pads may be arranged upstream or downstream of the rollers $b^2$.

The conductor laminations one above another are drawn by a second belt haul-off unit $B^1$ through further collection rollers $b^4$ to check the alignment and through a heated extruder head C which applies a coating of a polymeric plastics material such as p.v.c. to enclose the laminations in an insulating envelope $c$. The insulating envelope $c$ is of a matt p.v.c. as the heat during extruding removes the lubricant from those surfaces of the strips in contact with the envelope and the matt surface permits relative movement between the strips and the envelope when the conductor is flexed in use. A vacuum pump $C^1$ is connected to the extruder to withdraw air from between the conductors before they pass to the cooling trough D.

The number of laminations in each conductor is determined by the cross sectional area of the conductor required which may be of copper, aluminum, copper clad aluminum or other electrical conducting material.

The coated laminated conductor assembly after passing through the extruder C travels through the cooling trough D on the way to the haul-off unit $B^1$ and is then wound onto a drum $d$ or a coiler.

The following is an example of a p.v.c. compound for the extrusion envelope of the strips:

100 parts p.v.c. polymer
10 parts Silica (matting agent)
40 parts Plasticiser
7 parts Stabilizer Such a p.v.c. compound is available commercially.

It has been found in practice that there is insufficient adhesion between the electrically contacting conductor strips and between the P.V.C. envelope and the adjacent conductor strips to prevent them from relative movement over each other, thereby to allow the conductor assembly to flex stress-free in service.

It may be found necessary to lubricate each lamination to allow additional relative movement between the laminations during the winding onto the drum or coiler to counteract possible adhesion between the laminations but in practice this has been found to be generally unnecessary.

Alternatively the envelope $c$ may be of an elastomeric material. An example of an elastomeric material found to be suitable is butyl rubber.

Where an elastomeric coating is applied to cooler D is substituted by a vulcanising unit $D^1$ as shown diagrammatically in FIG. 2.

The correct length of conductor may be cut from the roll on the drum without waste and a terminal hole $a^1$ made therein. The coated laminations may be wound on to the drum or in a coil in any desired length.

What I claim is:

1. Apparatus for the continuous production of an insulation coated laminated metal electrical conductor assembly comprising means for continuously drawing flat metal conductor strips from a series of supply packages and assembling the strips one above the other with coextensive surfaces in electrically conductive contact, means for applying an electrically conductive lubricant to said surfaces between said strips for allowing relative movement between said strips in the assembly, means for coating the moving strip assembly by continuously extruding thereabout and therealong a surrounding continuous covering of electrically insulating material, means for setting said covering on the moving strip assembly, and means for winding the coated laminated conductor assembly into coil form.

2. The apparatus defined in claim 1, wherein said setting means is means defining a cooling zone through which the coated strip assembly is drawn.

3. The apparatus defined in claim 1, wherein said setting means is a vulcanizing unit through which the coated strip is drawn.

4. The apparatus as defined in claim 1, wherein said lubricant applying means applies lubricant to all flat surfaces of said conductor strips prior to said coating of the laminated assembly.

* * * * *